(12) United States Patent
Standke et al.

(10) Patent No.: US 6,685,766 B2
(45) Date of Patent: Feb. 3, 2004

(54) CORROSION INHIBITOR FOR STEEL-REINFORCED CONCRETE

(75) Inventors: Burkhard Standke, Loerrach (DE); Edward McGettigan, Staten Island, NY (US)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/287,511

(22) Filed: Nov. 5, 2002

(65) Prior Publication Data

US 2003/0101898 A1 Jun. 5, 2003

(30) Foreign Application Priority Data

Nov. 5, 2001 (DE) .......................................... 101 53 803

(51) Int. Cl.[7] .............................. C07F 7/02; C07F 7/08; C07F 7/10; C04B 41/49

(52) U.S. Cl. ................................. 106/14.41; 106/14.42; 106/14.15; 106/14.31; 106/287.1; 106/287.11; 106/287.13; 106/287.14; 106/806; 427/387; 427/421; 427/428; 427/429; 428/703

(58) Field of Search .................... 106/14.41, 14.42, 106/14.15, 14.31, 806, 287.1, 287.11, 287.13, 287.14; 427/387, 421, 428, 429; 428/703

(56) References Cited

U.S. PATENT DOCUMENTS

| | | | | |
|---|---|---|---|---|
| 5,314,533 A | * | 5/1994 | Goebel et al. | 106/287.13 |
| 5,458,923 A | * | 10/1995 | Goebel et al. | 427/387 |
| 5,527,937 A | | 6/1996 | Standke et al. | 556/470 |
| 5,536,860 A | | 7/1996 | Monkiewicz et al. | 556/413 |
| 5,629,400 A | | 5/1997 | Standke et al. | 528/38 |
| 5,646,325 A | | 7/1997 | Monkiewicz et al. | 556/440 |
| 5,679,147 A | | 10/1997 | Standke et al. | 106/287.11 |
| 5,739,369 A | * | 4/1998 | Matsumura et al. | 556/425 |
| 5,808,125 A | | 9/1998 | Standke et al. | 556/424 |
| 5,849,942 A | | 12/1998 | Standke et al. | 556/424 |
| 5,863,509 A | | 1/1999 | Standke et al. | 427/221 |
| 5,885,341 A | | 3/1999 | Standke et al. | 106/287.11 |
| 5,932,757 A | | 8/1999 | Standke et al. | 556/457 |
| 6,084,116 A | | 7/2000 | Horn et al. | 556/442 |
| 6,174,461 B1 | | 1/2001 | Miksic et al. | 252/389.32 |
| 6,177,582 B1 | | 1/2001 | Jenkner et al. | 556/425 |
| 6,177,584 B1 | | 1/2001 | Loewenberg et al. | 556/466 |
| 6,221,944 B1 | * | 4/2001 | Liebeskind et al. | 524/386 |
| 6,228,936 B1 | | 5/2001 | Standke et al. | 524/838 |
| 6,239,194 B1 | | 5/2001 | Standke et al. | 523/200 |
| 6,251,989 B1 | | 6/2001 | Edelmann et al. | 524/837 |
| 6,255,516 B1 | | 7/2001 | Jenkner et al. | 556/479 |
| 6,288,256 B1 | | 9/2001 | Standke et al. | 556/425 |
| 6,361,871 B1 | | 3/2002 | Jenkner et al. | 428/447 |
| 6,395,858 B1 | | 5/2002 | Mack et al. | 528/38 |
| 6,403,228 B1 | | 6/2002 | Mack et al. | 428/447 |
| 6,469,120 B1 | * | 10/2002 | Elfersy et al. | 528/29 |
| 6,491,838 B1 | | 12/2002 | Standke et al. | 252/8.57 |
| 6,500,883 B1 | * | 12/2002 | Mack et al. | 523/213 |
| 6,528,585 B1 | | 3/2003 | Standke et al. | 525/102 |
| 6,534,667 B1 | | 3/2003 | Standke et al. | 556/413 |

FOREIGN PATENT DOCUMENTS

CA 2300614 9/2000

* cited by examiner

*Primary Examiner*—Anthony J. Green
(74) *Attorney, Agent, or Firm*—Oblon, Spivak, McClelland, Maier & Neustadt, P.C.

(57) ABSTRACT

An organosilane- and/or organosiloxane-containing composition reduces active corrosion of steel reinforcement in concrete.

30 Claims, 1 Drawing Sheet

CORROSION INHIBITOR FOR STEEL-REINFORCED CONCRETE

BACKGROUND OF THE INVENTION

1. Field of the Invention

The present invention relates to a composition having a corrosion-inhibiting action, to its use and to a process for reducing active corrosion of steel reinforcement in concrete. The invention further relates to a concrete obtainable using such a composition.

2. Description of the Background

Although steel-reinforced concrete is generally very durable, concrete constructions suffer from visible damage which is attributable to corrosion of the steel reinforcement and sometimes occurs only a few years after the construction has been built, although the life of a steel-reinforced concrete construction is usually planned as 100 years. Visible damage on the steel reinforcement often occurs after as little as 20 years. Expensive maintenance work is the consequence. There is therefore a very great need for effective corrosion inhibitors for steel-reinforced concrete.

In the past, various approaches have been tried for this purpose:

Use is nowadays made mainly of corrosion-inhibiting concrete additives such as alkali metal or alkaline earth metal nitrates (U.S. Pat. Nos. 3,210,207, 3,801,338, 3,976,494, 4,092,109 and 4,365,999). Apart from the ecological and toxicological concerns associated with the nitrates, they have the disadvantage that they are soluble in water and can easily be leached from building materials comprising a mineral binder based on cement.

Furthermore, alkanolamines in admixture with trihydric or tetrahydric alcohols have been described (U.S. Pat. No. 4,726,914) for the protection of steel surfaces. However, the use of such materials in mineral building materials comprising a cement-based binder is not described.

EP 0 209 978 A2 describes water-miscible corrosion inhibitors based on hydroxylamines for protecting the steel reinforcement in concrete.

CH 686 368 likewise relates to water-soluble corrosion inhibitors based on hydroxylamines, but, in contrast to EP 0 209 978 A2, these are reacted with carboxylic acids to reduce their volatility before use as a corrosion inhibitor for steel-reinforced concrete. However, considering the high pH of cement-bonded building materials such as concrete, this method appears rather doubtful since, according to the generally held view among chemists, the free amine is formed again at high pH.

One thing that is beyond doubt is that hydroxylamines can reduce corrosion on steel surfaces. This is evidenced, for example, by the corrosion current measurements reported in the abovementioned documents.

Reduction in corrosion is generally only conceivable when corrosion inhibitor is added to binder. Thus, the corrosion inhibitor has to be used during production of the building material. A disadvantage of this is that the introduction of the corrosion inhibitor changes the rheological properties of the cement-bonded building material, e.g. concrete, which increases the complexity of present-day mixtures and is therefore generally not desirable. In addition, the water solubility and the vapor pressure of the substances used as corrosion inhibitors lead to undesirable mobility in the cement matrix.

In addition, the active ingredient can be lost by leaching. In the publication entitled "Migrating Corrosion Inhibitor Blend for Reinforced Concrete Part 2—Inhibitor as Repair Strategy" (Corrosion, vol. 56, No. 7, page 727 ff.), it was found that the action of water-soluble corrosion inhibitors as described in CH 686 368 on the surface of steel present in a cement matrix does not necessarily have a positive effect on the measurable corrosion currents. The cause of this is very probably the fact that the corrosion inhibitor cannot diffuse sufficiently well through the cement matrix, so that a concentration of inhibitor sufficient for a corrosion-reducing effect cannot reach the steel surface, although the inhibitor could act in a high concentration (10%) over a number of weeks. Such long times for the action are also impractical. In the surface treatment of concrete, for example in the case of waterproofing measures for protecting constructions, the contact times range from only a few minutes (liquid impregnation compositions) to a few hours (paste-like impregnation compositions).

It may be said that there is at present no corrosion inhibitor for steel reinforcement in cement-bonded mineral building materials (concrete) which in the case of existing structures can be applied to the surface of the building material and prevents corrosion of the steel reinforcement in the presence of existing active corrosion.

SUMMARY OF THE INVENTION

It is therefore an object of the invention to provide a corrosion inhibitor for steel-reinforced concrete which can, if appropriate, be applied to existing concrete structures or can be added to the concrete mixture and effectively reduces corrosion current at the steel reinforcement, particularly when chlorides and other harmful materials present have already triggered corrosion.

It has surprisingly been found that application of a preparation, i.e. a composition, based on alkylalkoxysilanes or alkylalkoxysiloxanes effects a significant reduction in the corrosion currents measured at the steel reinforcement in concrete, even when the concrete has already been damaged by chlorides which have penetrated into it.

DETAILED DESCRIPTION OF PREFERRED EMBODIMENTS

Figure 1:
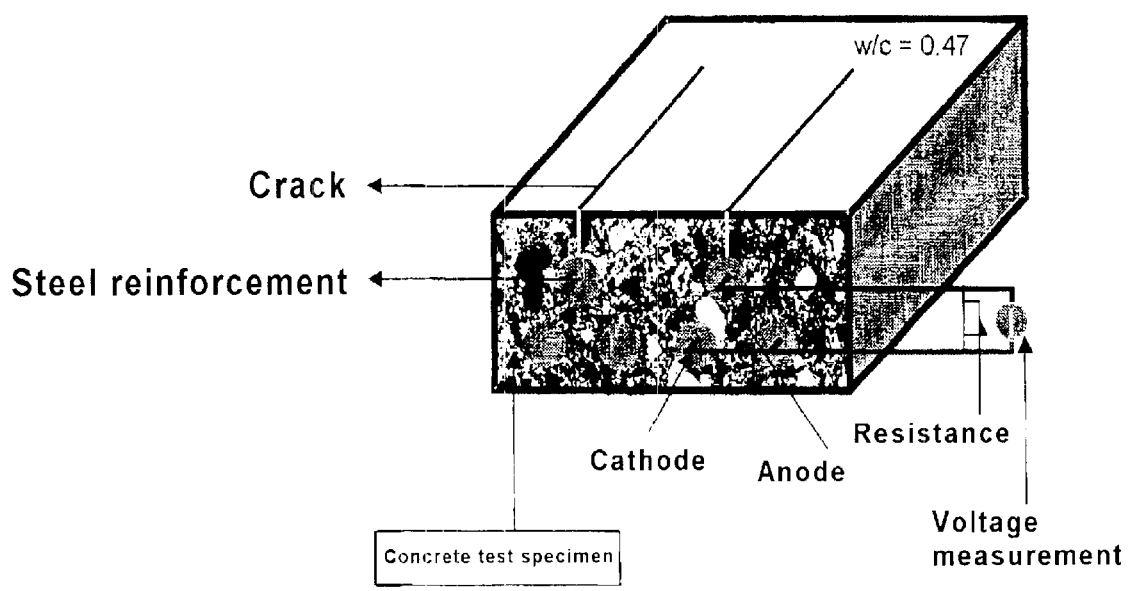
FIG. 1 is a schematic depiction of a method of measuring corrosion currents at a steel reinforcement in concrete.

It has been found that particular organofunctional silanes and/or siloxanes, namely alkylalkoxysilanes or alkylalkoxysiloxanes, optionally in combination with compounds bearing amino groups, which compounds may be soluble in alkylalkoxysilanes or alkylalkoxysiloxanes, for example particular aminosilanes or particular aminoalcohols, and optionally in combination with carboxylic acids or carboxylic acid salts soluble in alkylalkoxysilanes or alkylalkoxysiloxanes, preferably dinonylnaphthalenesulfonic acid or its alkaline earth metal salts, in particular calcium dinonylnaphthalenesulfonate or magnesium dinonylnaphthalenesulfonate, or correspondingly soluble mineral acids, can lastingly reduce corrosion currents at the steel reinforcement when allowed to act on the surface of steel-reinforced cement-bonded building materials or when a composition according to the invention, i.e. the present composition, is directly introduced into the concrete mixture during preparation of the concrete, and can even drastically reduce existing corrosion, for example corrosion triggered by chlorides.

Here, alkylalkoxysilanes or alkylalkoxysiloxanes having a particularly low chloride content are preferred. Preference is given to using said silanes or siloxanes having a chloride content of less than 100 ppm by weight, particularly preferably ones containing less than 50 ppm by weight of chloride, very particularly preferably less than 10 ppm by weight of chloride. Particularly when using alkylalkoxysilanes or alkylalkoxysiloxanes which are essentially free of chloride, i.e. silane products containing less than 3 ppm by weight of chloride, excellent results can be achieved within the scope of the present invention.

Thus, an advantageous reduction in the corrosion currents observed at the steel reinforcement by more than 50%, preferably more than 80%, particularly preferably more than 90%, compared to the corresponding unprotected concrete may be found.

The surprisingly high corrosion inhibition found by way of the corrosion current measurement is achieved according to the invention by means of alkylalkoxysilanes and/or alkylalkoxysiloxanes, preferably isobutyltriethoxysilane, octyltriethoxysilane or low-viscosity propylethoxysiloxanes, optionally in admixture with compounds bearing amino groups, e.g. aminosilanes, preferably aminopropyltriethoxysilane, or aminoalcohols, preferably diethylaminoethanol, which are miscible with the silane system used, and/or optionally in admixture with long-chain carboxylic acids or their calcium or magnesium salts, preferably calcium dinonylnaphthalenesulfonate, optionally with addition of further components, for example solvents or processing aids.

A composition according to the invention can generally be prepared in a simple and economical manner by good mixing or stirring together of the components specified according to the invention, for example by combining said organosilanes or organosiloxanes and, if desired, further active ingredients or active ingredient combinations and, if desired, a diluent or, if desired, a rheological auxiliary. Any slight turbidity occurring during the mixing process is generally removed by filtration.

The composition of the invention or at least one active ingredient present therein preferably has a low viscosity and penetrates readily. It is preferred that the composition of the invention or an active ingredient present therein, for example a compound of the formula I, or a corresponding combination of active ingredients has a viscosity of from 0.8 to 20 mPa·s, particularly preferably from 1.0 to 10 mPa·s.

To improve the application properties, the present composition can also be formulated by known methods as an aqueous low- or high-viscosity emulsion, with the viscosity of the active composition, viz. the oil phase, generally remaining unchanged. Here, formulation of the active ingredients as an aqueous emulsion and addition to the make-up water for the concrete is preferred so as to ensure a very homogeneous distribution.

The composition of the invention can further comprise, in addition to the active ingredients, the additional components solvents, diluents or solubilizers, e.g. mineral oil, petroleum spirit hydrocarbons, alcohols, in particular methanol, ethanol, n-propanol, i-propanol, n-butanol, i-butanol, sec-butanol, t-butanol, also diisotridecyl adipate, water, emulsifiers, rheological auxiliaries, optionally also thickeners such as finely divided clay, precipitated silica, pyrogenic silica, or an appropriate mixture thereof.

The present invention accordingly provides a composition for protecting steel-reinforced concrete against corrosion of the steel reinforcement, wherein the composition comprises, as corrosion-inhibiting component A, at least one organosilane or organosiloxane of the formula (I)

$$R\text{—}SiR^1_x(O)_yR^2_z \qquad (I),$$

where
- R is a linear or branched alkyl group having from 3 to 20 carbon atoms,
- $R^1$ is a linear or branched alkyl group having from 1 to 4 carbon atoms,
- $R^2$ is a linear or branched alkoxy group having from 1 to 4 carbon atoms or a hydroxy group, where groups $R^2$ may be identical or different,
- x is 0, 1 or 2,
- y is from 0.0 to 1.5,
- z is 0, 1, 2 or 3 and
- (x+2y+z)=3.

Preferred partial condensates based on organosilanes, i.e. organosiloxanes of the formula (I), are known, for example, from DE 100 56 344 and DE 100 56 343.

Preferably the component A is $n\text{-}C_3H_7Si(OCH_3)_3$, $n\text{-}C_3H_7Si(OC_2H_5)_3$, $i\text{-}C_3H_7Si(OCH_3)_3$, $i\text{-}C_3H_7Si(OC_2H_5)_3$, $n\text{-}C_4H_9Si(OCH_3)_3$, $n\text{-}C_4H_9Si(OC_2H_5)_3$, $i\text{-}C_4H_9Si(OCH_3)_3$, $i\text{-}C_4H_9Si(OC_2H_5)_3$, $n\text{-}C_5H_{11}Si(OCH_3)_3$, $n\text{-}C_5H_{11}Si(OC_2H_5)_3$, $i\text{-}C_5H_{11}Si(OCH_3)_3$, $i\text{-}C_5H_{11}Si(OC_2H_5)_3$, $n\text{-}C_6H_{13}Si(OCH_3)_3$, $n\text{-}C_6H_{13}Si(OC_2H_5)_3$, $i\text{-}C_6H_{13}Si(OCH_3)_3$, $i\text{-}C_6H_{13}Si(OC_2H_5)_3$, $n\text{-}C_8H_{17}Si(OCH_3)_3$, $n\text{-}C_8H_{17}Si(OC_2H_5)_3$, $i\text{-}C_8H_{17}Si(OCH_3)_3$, $i\text{-}C_8H_{17}Si(OC_2H_5)_3$, $n\text{-}C_{10}H_{21}Si(OCH_3)_3$, $n\text{-}C_{10}H_{21}Si(OC_2H_5)_3$, $i\text{-}C_{10}H_{21}Si(OCH_3)_3$, $i\text{-}C_{10}H_{21}Si(OC_2H_5)_3$, $n\text{-}C_{16}H_{33}Si(OCH_3)_3$, $n\text{-}C_{16}H_{33}Si(OC_2H_5)_3$, $i\text{-}C_{16}H_{33}Si(OCH_3)_3$, $i\text{-}C_{16}H_{33}Si(OC_2H_5)_3$, or partial condensates of one or more of the specified alkylalkoxysilanes or a mixture of the specified alkylalkoxysilanes, a mixture of the partial condensates or a mixture of alkylalkoxysilanes and partial condensates.

The present invention further provides for the use of organosilanes or organosiloxanes of the formula (I) for protecting steel-reinforced concrete against corrosion of the steel reinforcement.

In general, compositions according to the invention also have an excellent shelf life.

Application of the novel composition in low-viscosity to high-viscosity form, i.e. paste-like form, or else in emulsified form can advantageously be carried out by spraying, painting, rolling or doctorblade coating. The composition of the invention is advantageously applied in an amount of more than 50 g/m², preferably more than 100 g/m², particularly preferably more than 200 g/m², to the surface of the concrete. If desired, multiple application with a drying time of, for example, from 2 hours to about 2 days between applications, may be employed, particularly when the desired amount of active ingredient cannot be applied in a single step because the substrate is not sufficiently absorptive.

The present invention therefore also provides a process for reducing corrosion of steel reinforcement in steel-reinforced concrete, in which a composition according to the invention is applied to a steel-reinforced concrete surface.

However, the composition of the invention can also be introduced directly into the still unset concrete in the preparation of a concrete mixture.

For this reason, the present invention likewise provides for the use of a composition according to the invention for inhibiting corrosion of steel reinforcement in concrete, by mixing the composition of the invention into the concrete during the production process. In particular, the addition of a water-based emulsion of active ingredient to the make-up water for the concrete can prove useful. Based on the cement mixture, preference is given to using from 0.5 to 3% by weight of active ingredient, i.e. composition according to the invention.

The invention further provides a concrete which is protected against corrosion of steel reinforcement and is obtainable by application the inventive composition to a steel-reinforced concrete surface.

Alkylalkoxysilanes or siloxanes are usually used for the impregnation (waterproofing) of porous, mineral building material. The aim of this measure is to keep out water and harmful materials dissolved therein, for example chlorides. According to the present invention, on the other hand, it has surprisingly and advantageously been recognized that the use of specific alkylalkoxysilane- or alkylalkoxysiloxane-containing compositions enables the corrosion, as can be determined by measurement of corrosion currents, of steel reinforcement in cement-bonded mineral materials to be significantly reduced, in particular that existing corrosion can be stopped or at least effectively reduced by use of the present composition.

It has also been found that application according to the invention of a present liquid inhibitor system to concrete surfaces can significantly reduce corrosion currents at the steel reinforcement, even in the case of existing active corrosion and even in the case of a concrete damaged by cracks. The liquid inhibitor formulation can be applied directly to the concrete surface. Suitable application methods are known methods such as spraying, pouring, rolling, brushing and the like. The inhibitor formulation can also be formulated as an emulsion by means of methods known per se and can be applied appropriately. Such an emulsion is advantageously applied to the concrete surface by means of the above-described known methods, while paste-like, highly viscous emulsions can also be applied by doctorblade coating. Care generally has to be taken to ensure that a sufficient amount of product can penetrate into the concrete so as to achieve a satisfactory protective action. A sufficient protective action is generally achieved when the measurable corrosion currents are reduced by preferably more than 80% compared to the unprotected surface. Such a protective action is generally achieved by means of the inhibitor systems of the invention when the amount applied is more than 200 g/m$^2$. In general, it has to be ensured that all of the material applied penetrates into the concrete. It is particularly advisable to employ multiple application or to apply high-viscosity products according to the invention, e.g. paste-like emulsions or inhibitor compositions thickened by means of Theological auxiliaries. The inhibitor composition can be thickened by means of, for example, finely divided solid materials such as pyrogenic silica or particular finely divided clay minerals such as kaolin. When using a high-viscosity composition according to the invention, more than 200 g/m$^2$ can be applied in a single step without substantial product losses due to running-off even in the case of vertical surfaces.

The present invention is illustrated by the following examples and comparative examples.

EXAMPLES

Corrosion Current Measurements:

The corrosion current measurements can be carried out by known methods, for example by the linear polarization method. This method is suitable, in particular, for measurements on building sites since the measuring apparatus is portable (e.g. Gecor 6, James Instruments Inc.).

In the laboratory, the effectiveness of the inhibitor solutions can be determined by the following method: (1) production of specific, steel-reinforced concrete test specimens; (2) application of inhibitor composition; (3) cyclic storage of specimens in salt water; and (4) measurement of the corrosion in the specimens by measuring the voltage between steel reinforcements over a 10 ohm resistance.

The measurement method, cf. FIG. 1, is designed on the basis of methods customary for the purposes of the FHWA (Federal Highway Administration, USA). The measurement method can be made closer to practice by introducing artificial microcracks, which extend to the steel reinforcement, into the concrete test specimens.

The water/cement (w/c) ratio of the concrete test specimens used was 0.47. The artificial cracks can be obtained by insertion of stainless steel sheets having a thickness of 0.03 mm during the production of the test specimens. The stainless steel sheets were generally removed before the concrete had cured completely, so as to leave a crack which reaches as far as the steel reinforcement and extends along the total length of the steel reinforcement. The area of each reinforcing rod is generally 126 mm$^2$. The weight loss of the steel reinforcement due to corrosion is directly proportional to the corrosion current which is determined via the measured voltage by means of Ohm's law. The measured voltage or the corrosion current determined therefrom can therefore be regarded as a direct measure of the corrosion at the given time. Thus, for example, a reduction of 10% in the measured voltage corresponds to a reduction of the amount of iron lost as a result of corrosion per unit time of likewise 10%. To obtain measurable results quickly and to simulate realistic conditions, the test specimens were subjected to a cyclic storage test in salt water (15% strength by weight NaCl solution in water). This simulates, for example, exposure of real concrete structures to deicing salts or seawater. The test cycles were carried out for 48 weeks. Each test cycle consisted of storage in salt water at about 20° C. for 4 days (here, the test specimens were brought into contact with salt water only on the surface at which the artificial cracks were located) and drying at about 40° C. for three days. Chloride penetrating into the concrete damages the passive layer of the steel reinforcement and leads during the course of the test to a significant increase in the measurable corrosion currents. In addition to the corrosion currents, all externally visible changes in the test specimens were documented. In the test as in practice, rusting steel reinforcement causes delamination, crack formation, brown rust streaks on the surface and even complete destruction of the test specimen. Thus, the test period of 48 weeks simulated the conditions which occur in practice over a period of from about 20 to 50 years (depending on exposure). The test chosen is therefore very closely related to practice. At the end of the test, the steel reinforcement in the test specimens was laid bare and examined for corrosion. Unprotected concrete displayed externally visible traces of corrosion after only 12 weeks. The laid-bare reinforcing iron was seriously corroded. The concrete test specimens treated by the process claimed displayed no externally visible traces of corrosion even after the end of the test (48 weeks) and no corrosion or only insignificant traces of corrosion were recognizable on the laid-bare reinforcing iron. In a trial it could be demonstrated that the claimed process for corrosion inhibition is also effective on concrete which has already been damaged by chloride. For this purpose, a test specimen was subjected to the cyclic storage in saltwater until significant corrosion was found. The cracked surface which had been damaged by chloride was subsequently treated by means of the process described. The test cycle was continued on the now treated test specimen. It was surprisingly found that even under these extremely severe test conditions, the measured corrosion currents are drastically reduced. This means that cracked, chloride-damaged concrete can effectively be protected against corrosion of the steel reinforcement by means of the process described.

Formulation of the Inhibitor Mixture and Application:

Alkylalkoxysilanes or corresponding siloxanes are, if desired, mixed with amino-functional compounds, as component B; and/or carboxylic acids or salts or carboxylic acids, as component C; and/or an aminoalcohol, as component D. The resulting mixture is present as a single phase. If necessary, it is stirred and heated to help this occur. Mixing times of from 1 minute to a number of hours in a temperature range from 20° C. to the initial boiling point of the alkylalkoxysilane mixture or alkylalkoxysiloxane mixture (up to about 180° C.) have been found to be useful. Chemical reactions can occur during mixing. Examples which may be mentioned are:

$$R-Si(OR^1)_3 + n(C_2H_5)NC_2H_4OH \rightarrow R-Si(OR^1)_{3-n'}$$
$$[(C_2H_5)NC_2H_4O]_n + nR^1OH$$

$$R-Si(OR^1)_3 + nR^2COOH \rightarrow R-Si(OR^1)_{3-n}(R^2COO)_n + nR^1OH$$

Preferably, the component B is selected from the group consisting of $NH_2(CH_2)_3Si(OC_2H_5)_3$, $NH_2(CH_2)_3Si(OCH_3)_3$, $NH_2(CH_2)_3SiCH_3(OC_2H_5)_2$, $NH_2(CH_2)_3SiCH_3(OCH_3)_2$, $NH_2(CH_2)_2NH(CH_2)_3Si(OC_2H_5)_3$, $NH_2(CH_2)_2NH(CH_2)_3Si(OCH_3)_3$, $NH_2(CH_2)_2NH(CH_2)_2NH(CH_2)Si(OC_2H_5)_3$, $NH_2(CH_2)_2NH(CH_2)_2NH(CH_2)_3Si(OCH_3)_3$, $NH_2(CH_2)_2N[NH_2(CH_2)_2](CH_2)_3Si(OCH_3)_3$, $NH_2(CH_2)_2NH(CH_2)_3Si(CH_3)(OCH_3)_2$, $NH_2(CH_2)_2NH(CH_2)_3Si(CH_3)(OC_2H_5)_3$, $C_4H_9NH(CH_2)_3Si(OC_2H_5)_3$, $C_4H_9NH(CH_2)_3Si(OCH_3)_3$, $[(C_2H_5O)_3Si(CH_2)_3]_2NH$, $[(C_2H_5O)_3Si(CH_2)_3]_3N$, $[(CH_3O)_3Si(CH_2)_3]_2NH$, $[(CH_3O)_3Si(CH_2)_3]_3N$, and partial condensates thereof.

Preferably the composition contains from 0 to 60% by weight, more preferably 0.01 to 10% by weight, even more preferably 1 to 5% by weight of the component B, based on the component A.

Preferably, the component C is selected from the group consisting of dinonylnaphthalenesulfonic acid and an alkaline earth metal salt of dinonylnaphthalenesulfonic acid.

Preferably the composition contains from 0 to 50% by weight; more preferably 0.01 to 10% by weight; even more preferably 0.5 to 5% by weight of the component C, based on the component A.

Preferably, the component D is at least one aminoalcohol of the formula (III)

$$HO-CH_2-CH_2-NR^9{}_2 \qquad (III)$$

where groups $R^9$ are identical or different; and $R^9$ is a hydrogen atom or a linear or branched alkyl group having from 1 to 20 carbon atoms.

More preferably, the component D is selected from the group consisting of $HO-CH_2-CH_2-N(CH_3)_2$ and $HO-CH_2-CH_2-N(C_2H_5)_2$.

After mixing, the resulting single-phase mixture is generally liquid and has a low viscosity (viscosity usually <10 mPa·s, for example <5 mPa·s, in particular <1.5 mPa·s). In addition, a solvent can be used to adjust the viscosity. Suitable solvents are, for example, alcohols, preferably ethanol, methanol or isopropanol or petroleum spirit hydrocarbons such as petroleum ether or solvent naphtha. The liquid inhibitor mixture is either applied directly to the concrete surface or is formulated by known methods as an oil-in-water emulsion and applied in the form of the aqueous emulsion to the concrete surface. In the case of aqueous emulsions, it is possible to employ both low-viscosity and high-viscosity emulsions. High-viscosity emulsions can be advantageous in some cases, particularly when a large amount of product is to be applied in one application step. In the process described, it is important that a sufficient amount of active ingredient (not solvent; not continuous phase, i.e., water, in the case of an oil-in-water emulsion) penetrates into the concrete. To achieve this, it has been found to be useful to employ multiple application, i.e. the inhibitor formulation is applied a number of times to the concrete surface. Appropriate drying times have to be ensured. The surface must at least look dry before the next application is commenced. This procedure is repeated until the desired amount of product has been absorbed by the substrate (concrete). In the case of normal concrete, from 1 to 6 individual applications are necessary in practice for a total amount of active inhibitor of at least 150 g/m² to be absorbed. The number of individual applications depends on the porosity of the concrete. The denser (less permeable) the concrete, the more individual applications are necessary. The porosity of the binder phase of concrete is determined by the water/cement (w/c) ratio. The lower the w/c value, the denser (and less permeable) is the binder phase of the concrete. Particular preference is given to absorption of more than 200 g of active ingredient/m², very particularly preferably absorption of more than 400 g of active ingredient/m².

Example 1

Treatment of Concrete with a Mixture of Isobutyltriethoxysilane and Diethylaminoethanol 980 g of isobutyltriethoxysilane were mixed with 20 g of diethanolamine and stirred at 40° C. for 30 minutes. The viscosity of the product was 1 mpa·s.

Steel-reinforced concrete test specimens as shown in FIG. 1 (30×30×18 cm) which had been provided with artificial cracks and were about 65 days old were treated on the surface on which the cracks running through to the steel reinforcement were located with the above-described, liquid, low-viscosity corrosion inhibitor. For this purpose, the surface was sprayed three times with an applied amount of 180 g/m² each time. The drying time between the individual spray applications was in each case 45 minutes. The treated concrete surface was subsequently provided with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 0.1 mA | 0.2 mA | 0.4 mA |

Visual evaluation of the concrete test specimen during the test and after the end of the test:

|  | Test time | | |
| --- | --- | --- | --- |
|  | 1 week | 12 weeks | 48 weeks |
| Visual assessment | No change | No change | No change |

Visual assessment of the laid-bare steel reinforcement after the end of the test:

No significant traces of corrosion were observed.

Example 2
Treatment of Concrete with Isobutyltriethoxysilane

Steel-reinforced concrete test specimens as shown in FIG. 1 (30×30×18 cm) which had been provided with artificial cracks and were about 65 days old were treated on the surface on which the cracks running through to the steel reinforcement were located with isobutylethoxysilane. The purity of the product was about 95% (GC WLD percent by area). The surface was sprayed twice with an amount each time of 180 g/m². The drying time between the individual spray applications was in each case 45 minutes. The treated concrete surface was subsequently provided with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 150 mA | 90 mA | 180 mA |

Visual evaluation of the concrete test specimen during the test and after the end of the test:

|  | Test time | | |
| --- | --- | --- | --- |
|  | 1 week | 12 weeks | 48 weeks |
| Visual assessment | No change | No change | No change |

Visual assessment of the laid-bare steel reinforcement after the end of the test:

Slight traces of corrosion, limited to the parts of the steel reinforcement in the direct vicinity of the artificial cracks.

Example 3
Treatment of Concrete with a Mixture of Oligomeric Propylsiloxanes and Aminopropyltriethoxysilane 980 g of an oligomeric n-propylethoxysiloxane having a mean molecular weight of about 600 g/mol and a viscosity of 5 mPa·s were mixed with 20 g of 3-aminopropyltriethoxysilane and stirred at 40° C. for 30 minutes. The viscosity of the product was then about 5 mPa·s.

Steel-reinforced concrete test specimens as shown in FIG. 1 (30×30×18 cm) which had been provided with artificial cracks and were about 65 days old were treated on the surface on which the cracks running through to the steel reinforcement were located with the above-described, liquid, low-viscosity corrosion inhibitor. For this purpose, the surface was sprayed three times with an applied amount of about 200 g/m² each time. The drying time between the individual spray applications was in each case 90 minutes. The treated concrete surface was subsequently provided with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 0.1 mA | 0.6 mA | 2.3 mA |

Visual evaluation of the concrete test specimen during the test and after the end of the test:

|  | Test time | | |
| --- | --- | --- | --- |
|  | 1 week | 12 weeks | 48 weeks |
| Visual assessment | No change | No change | No change |

Visual assessment of the laid-bare steel reinforcement after the end of the test:

Slight traces of corrosion in the vicinity of the artificial cracks.

Example 4
Treatment of Concrete with a mixture of Isobutyltriethoxysilane Diethylaminoethanol and the Magnesium Salt of Dinonylnaphthalenesulfonic Acid 960 g of isobutyltriethoxysilane were mixed with 20 g of diethylaminoethanol and 20 g of NA-SUL MG/DITA (magnesium dinonylnaphthalenesulfonate in triisodecyl adipate, Lehmann & Voss & Co.) and stirred at 40° C. for 30 minutes. The viscosity of the product was then about 1.5 mPa·s.

Steel-reinforced concrete test specimens as shown in FIG. 1 (30×30×18 cm) which had been provided with artificial cracks and were about 65 days old were treated on the surface on which the cracks running through to the steel reinforcement were located with the above-described, liquid, low-viscosity corrosion inhibitor. For this purpose, the surface was sprayed three times with an applied amount of about 150 g/m² each time. The drying time between the individual spray applications was in each case 60 minutes. The treated concrete surface was subsequently provided with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 0.4 mA | 0.1 mA | 6.4 mA |

Visual evaluation of the concrete test specimen during the test and after the end of the test:

|  | Test time | | |
| --- | --- | --- | --- |
|  | 1 week | 12 weeks | 48 weeks |
| Visual assessment | No change | No change | No change |

Example 5
Treatment of Chloride-Damaged Concrete with a Mixture of Isobutyltriethoxysilane and Diethylaminoethanol Concrete test specimens as shown in FIG. 1 (30×30×18 cm) were provided on the surface on which the cracks running through to the steel reinforcement were located with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. After 12 weeks, the now chloride-damaged concrete which, according to the corrosion current measurements, already displayed significant active corrosion of the steel reinforcement was treated with an inhibitor solution as described in Example 1. The liquid product was applied three times to the dry concrete surface. 180 g/m² were applied each time. The drying time between the individual applications was in each case 45 minutes. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 548 mA | 292 mA | 15.1 mA |

After application of the corrosion inhibitor, the measured corrosion currents decrease significantly.

Visual evaluation of the concrete test specimen during the test and after the end of the test:

|  | Test time | | |
| --- | --- | --- | --- |
|  | 1 week | 12 weeks | 48 weeks |
| Visual assessment | No change | Rust efflorescence | Slight rust efflorescence |

Visual assessment of the laid-bare steel reinforcement after the end of the test:

Slight corrosion on the entire surface of the reinforcing iron.

Comparative Example 1
Untreated Concrete

Concrete test specimens as shown in FIG. 1 (30×30×18 cm) were provided on the surface on which the cracks running through to the steel reinforcement were located with a Plexiglas border. The Plexiglas border was sealed onto the concrete by means of a plastic sealing composition. Aqueous 15% strength by weight NaCl solution was placed in the resulting pan. The macrocell corrosion current was determined with the aid of Ohm's law by means of the measured voltage drop over a 10 ohm resistance connected between the upper and lower sites of the steel reinforcement. After, in each case, exposure to salt water for 4 days at about 20° C., the salt solution was removed and the concrete test specimen was dried at about 40° C. for 3 days. NaCl was then again placed in the pan formed by the Plexiglas border and the next salt exposure cycle was thus commenced. The salt exposure and drying cycles were repeated until the total test time had reached 48 weeks. The corrosion currents measured by way of the voltage drop over the 10 ohm resistance were documented over the entire duration of the test.

Corrosion currents as a function of time over the duration of the test:

|  | Test time | | |
| --- | --- | --- | --- |
|  | 1 week | 12 weeks | 48 weeks |
| Corrosion current | 598 mA | 299 mA | 540 mA |

Visual evaluation of the concrete test specimen during the test and after the end of the test:

|  | Test time | | |
| --- | --- | --- | --- |
|  | 1 week | 12 weeks | 48 weeks |
| Visual assessment | No change | Rust efflorescence | Severe rust efflorescence and crack formation |

Visual assessment of the laid-bare steel reinforcement after the end of the test:

Severe corrosion on the entire surface of the reinforcing iron.

The disclosure of the priority document, DE 10153803.0, filed in Germany on Nov. 5, 2001, is incorporated by reference herein in its entirety.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A composition for protecting steel-reinforced concrete against corrosion of the steel reinforcement, wherein the composition comprises, as a component A, at least one organosilane or organosiloxane of the formula (I)

$$R\text{—}SiR^1{}_x(O)_y R^2{}_z \tag{I}$$

where
R is a linear or branched alkyl group having from 3 to 20 carbon atoms;
$R^1$ is a linear or branched alkyl group having from 1 to 4 carbon atoms;
$R^2$ is a linear or branched alkoxy group having from 1 to 4 carbon atoms or a hydroxy group, where groups may be identical or different;
x is 0, 1 or 2;
y is from 0.0 to 1.5;
z is 0, 1, 2 or 3; and
(x+2y+z)=3, wherein
the composition is an oil-in-water emulsion; and
an oil phase of the oil-in-water emulsion comprises at least one of the component A, a component B, a component C, and a component D, where
the component B comprises at least one aminosilane or aminosiloxane of the formula (II)

$$R^4{}_2N\text{—}(R^5\text{—}NR)_a\text{—}R^6\text{—}Si(R^7)_b O_c(OR^8)_d \tag{II}$$

where
$R^4$ is a hydrogen atom or a linear or branched alkyl group having from 1 to 20 carbon atoms, and groups $R^4$ are identical or different;
$R^5$ is a linear or branched alkylene group having from 1 to 20 carbon atoms;
$R^6$ is a linear or branched alkylene group having from 1 to 20 carbon atoms;
$R^7$ is a linear or branched alkyl group having from 1 to 4 carbon atoms;
$R^8$ is a hydrogen atom or a linear or branched alkyl group having from 1 to 4 carbon atoms, and groups $R^8$ are identical or different;
a is 0, 1, 2, 3 or 4;
b is 0, 1 or 2;
c is from 0.0 to 1.5;
d is 0, 1, 2 or 3; and
(b+2c+d)=3;
the component C comprises at least one carboxylic acid or salt of a carboxylic acid; and
the component D comprises at least one aminoalcohol of the formula (III)

$$HO\text{—}CH_2\text{—}CH_2\text{—}NR^9{}_2 \tag{III}$$

where
groups $R^9$ are identical or different; and
$R^9$ is a hydrogen atom or a linear or branched alkyl group having from 1 to 20 carbon atoms.

2. The composition as claimed in claim 1, wherein the component A is selected from the group consisting of the following alkylalkoxysilanes n-$C_3H_7Si(OCH_3)_3$, n-$C_3H_7Si(OC_2H_5)_3$, i-$C_3H_7Si(OCH_3)_3$, i-$C_3H_7Si(OC_2H_5)_3$, n-$C_4H_9Si(OCH_3)_3$, n-$C_4H_9Si(OC_2H_5)_3$, i-$C_4H_9Si(OCH_3)_3$, i-$C_4H_9Si(OC_2H_5)_3$, n-$C_5H_{11}Si(OCH_3)_3$, n-$C_5H_{11}Si(OC_2H_5)_3$, i-$C_5H_{11}Si(OCH_3)_3$, i-$C_5H_{11}Si(OC_2H_5)_3$, n-$C_6H_{13}Si(OCH_3)_3$, n-$C_6H_{13}Si(OC_2H_5)_3$, i-$C_6H_{13}Si(OCH_3)_3$, i-$C_6H_{13}Si(OC_2H_5)_3$, n-$C_8H_{17}Si(OCH_3)_3$, n-$C_8H_{17}Si(OC_2H_5)_3$, i-$C_8H_{17}Si(OCH_3)_3$, i-$C_8H_{17}Si(OC_2H_5)_3$, n-$C_{10}H_{21}Si(OCH_3)_3$, n-$C_{10}H_{21}Si(OC_2H_5)_3$, i-$C_{10}H_{21}Si(OCH_3)_3$, i-$C_{10}H_{21}Si(OC_2H_5)_3$, n-$C_{16}H_{33}Si(OCH_3)_3$, n-$C_{16}H_{33}Si(OC_2H_5)_3$, i-$C_{16}H_{33}Si(OCH_3)_3$, i-$C_{16}H_{33}Si(OC_2H_5)_3$, and partial condensates thereof.

3. The composition as claimed in claim 1, wherein the oil phase comprises the component B.

4. The composition as claimed in claim 3, wherein the composition contains from 0.01 to 60% by weight of the component B, based on the component A.

5. The composition as claimed in claim 4, wherein the composition contains from 0.01 to 10% by weight of the component B, based on the component A.

6. The composition as claimed in claim 5, wherein the composition contains from 1 to 5% by weight of the component B, based on the component A.

7. The composition as claimed in claim 3, wherein the component B is selected from the group consisting of $NH_2(CH_2)_3Si(OC_2H_5)_3$,
$NH_2(CH_2)_3Si(OCH_3)_3$,
$NH_2(CH_2)_3SiCH_3(OC_2H_5)_2$,
$NH_2(CH_2)_3SiCH_3(OCH_3)_2$,
$NH_2(CH_2)_2NH(CH_2)_3Si(OC_2H_5)_3$,
$NH_2(CH_2)_2NH(CH_2)_3Si(OCH_3)_3$, $NH_2(CH_2)_2NH(CH_2)_2NH(CH_2)Si(OC_2H_5)_3$,
$NH_2(CH_2)_2NH(CH_2)_2NH(CH_2)_3Si(OCH_3)_3$,
$NH_2(CH_2)_2N[NH_2(CH_2)_2](CH_2)_3Si(OCH_3)_3$, $NH_2(CH_2)_2NH(CH_2)_3Si(CH_3)(OCH_3)_2$,
$NH_2(CH_2)_2NH(CH_2)_3Si(CH_3)(OC_2H_5)_3$,
$C_4H_9NH(CH_2)_3Si(OC_2H_5)_3$,
$C_4H_9NH(CH_2)_3Si(OCH_3)_3$,
$[(C_2H_5O)_3Si(CH_2)_3]_2NH$,
$[(C_2H_5O)_3Si(CH_2)_3]_3N$,
$[(CH_3O)_3Si(CH_2)_3]_2NH$,
$[(CH_3O)_3Si(CH_2)_3]_3N$, and partial condensates thereof.

8. The composition as claimed in claim 1, wherein the oil phase comprises the component C.

9. The composition as claimed in claim 8, wherein the component C is selected from the group consisting of dinonylnaphthalenesulfonic acid and an alkaline earth metal salt of dinonylnaphthalenesulfonic acid.

10. The composition as claimed in claim 8, wherein the composition contains from 0.01 to 50% by weight of the component C, based on the component A.

11. The composition as claimed in claim 10, wherein the composition contains from 0.01 to 10% by weight of the component C, based on the component A.

12. The composition as claimed in claim 11, wherein the composition contains from 0.5 to 5% by weight of the component C, based on the component A.

13. The composition as claimed in claim 1, wherein the oil phase comprises the component D.

14. The composition as claimed in claim 13, wherein the component D is selected from the group consisting of $HO-CH_2-CH_2-N(CH_3)_2$ and $HO-CH_2-CH_2-N(C_2H_5)_2$.

15. The composition as claimed in claim 1, wherein the composition has a viscosity of 10 mPa·s or less.

16. The composition as claimed in claim 1, wherein the composition further comprises at least one selected from the group consisting of diisotridecyl adipate, mineral oil, petroleum spirit hydrocarbons, alcohols, water, emulsifiers, rheological auxiliaries, and thickeners.

17. A method of making a steel corrosion reducing composition, the method comprising mixing a component A and at least one of a component B, a component C and a component D; and producing the composition of claim 1, wherein the component A comprises at least one organosilane or organosiloxane of the formula (I)

$$R-SiR^1_{x(O)y}R^2_z \qquad (I),$$

where

R is a linear or branched alkyl group having from 3 to 20 carbon atoms;

$R^1$ is a linear or branched alkyl group having from 1 to 4 carbon atoms;

$R^2$ is a linear or branched alkoxy group having from 1 to 4 carbon atoms or a hydroxy group, where groups may be identical or different;

x is 0, 1 or 2;

y is from 0.0 to 1.5;

z is 0, 1, 2 or 3; and (x+2y+z)=3;

the component B comprises at least one aminosilane or aminosiloxane of the formula (II)

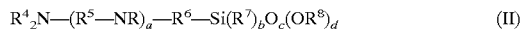

$$R^4_2N-(R^5-NR)_a-R^6-Si(R^7)_bO_c(OR^8)_d \qquad (II)$$

where $R^4$ is a hydrogen atom or a linear or branched alkyl group having from 1 to 20 carbon atoms, and groups $R^4$ are identical or different;

$R^5$ is a linear or branched alkylene group having from 1 to 20 carbon atoms;

$R^6$ is a linear or branched alkylene group having from 1 to 20 carbon atoms;

$R^7$ is a linear or branched alkyl group having from 1 to 4 carbon atoms;

$R^8$ is a hydrogen atom or a linear or branched alkyl group having from 1 to 4 carbon atoms, and groups RE are identical or different;

a is 0, 1, 2, 3 or 4;

b is 0, 1 or 2;

c is from 0.0 to 1.5;

d is 0, 1, 2 or 3; and (b+2c+d)=3;

the component C comprises at least one carboxylic acid or salt of a carboxylic acid; and the component D comprises at least one aminoalcohol of the formula (III)

$$HO-CH_2-CH_2-NR^9_2 \qquad (III)$$

where groups $R^9$ are identical or different; and $R^9$ is a hydrogen atom or a linear or branched alkyl group having from 1 to 20 carbon atoms.

18. A method of using a corrosion reducing composition to reduce corrosion of steel reinforcement in steel-reinforced concrete, the method comprising applying the composition of claim 1 to a steel-reinforced concrete surface.

19. The method as claimed in claim 18, wherein the composition is applied by spraying, painting, rolling or doctorblade coating.

20. The method as claimed in claim 18, wherein the composition is applied in an amount of more than 50 g/m² to the concrete surface.

21. The method as claimed in claim 20, wherein the composition is applied in an amount of more than 100 g/m² to the concrete surface.

22. The method as claimed in claim 21, wherein the composition is applied in an amount of more than 200 g/m² to the concrete surface.

23. A method of using a corrosion reducing composition to reduce corrosion of steel reinforcement in steel-reinforced concrete, the method comprising mixing the composition of claim 1 with concrete to form a mixture; and applying the mixture to the steel reinforcement.

24. A steel-reinforced concrete produced by a process comprising applying the composition of claim 1 to a steel-reinforced concrete surface.

25. A steel-reinforced concrete produced by a process comprising mixing the composition of claim 1 with concrete to form a mixture; and applying the mixture to steel reinforcement.

26. A composition for protecting steel-reinforced concrete against corrosion of the steel reinforcement, wherein the composition comprises, as a component A, at least one organosilane or organosiloxane of the formula (I)

$$R\!-\!SiR^1_x(O)_y R^2_z \qquad (I),$$

where

R is a linear or branched alkyl group having from 3 to 20 carbon atoms;

$R^1$ is a linear or branched alkyl group having from 1 to 4 carbon atoms;

$R^2$ is a linear or branched alkoxy group having from 1 to 4 carbon atoms or a hydroxy group, where groups $R^2$ may be identical or different;

x is 0, 1 or 2;

y is from 0.0 to 1.5;

z is 0, 1, 2 or 3; and (x+2y+z)=3, wherein the composition further comprises at least one of a component C and a component D, where the component C comprises at least one carboxylic acid or salt of a carboxylic acid; and the component D comprises at least one aminoalcohol of the formula (III)

$$HO\!-\!CH_2\!-\!CH_2\!-\!NR^9_2 \qquad (III)$$

where groups $R^9$ are identical or different; and $R^9$ is a hydrogen atom or a linear or branched alkyl group having from 1 to 20 carbon atoms.

27. The composition as claimed in claim 26, wherein the composition further comprises the component C.

28. The composition as claimed in claim 26, wherein the composition contains from 0.01 to 50% by weight of the component C, based on the component A.

29. The composition as claimed in claim 26, wherein the composition further comprises the component D.

30. A method of making a steel corrosion reducing composition, the method comprising mixing a component A and at least one of a component C and a component D; and producing the composition of claim 26, wherein the component A comprises at least one organosilane or organosiloxane of the formula (I)

$$R\!-\!SiR^1_x(O)_y R^2_z \qquad (I),$$

where

R is a linear or branched alkyl group having from 3 to 20 carbon atoms;

$R^1$ is a linear or branched alkyl group having from 1 to 4 carbon atoms;

$R^2$ is a linear or branched alkoxy group having from 1 to 4 carbon atoms or a hydroxy group, where groups $R^2$ may be identical or different;

x is 0, 1 or 2;

y is from 0.0 to 1.5;

z is 0, 1, 2 or 3; and (x+2y+z)=3;

the component C comprises at least one carboxylic acid or salt of a carboxylic acid; and the component D comprises at least one aminoalcohol of the formula (III)

$$HO\!-\!CH_2\!-\!CH_2\!-\!NR^9_2 \qquad (III)$$

where groups $R^9$ are identical or different; and $R^9$ is a hydrogen atom or a linear or branched alkyl group having from 1 to 20 carbon atoms.

* * * * *